(12) United States Patent
Kubota et al.

(10) Patent No.: US 7,862,914 B2
(45) Date of Patent: Jan. 4, 2011

(54) HEATSINK FILMS FOR MAGNETIC RECORDING MEDIA

(75) Inventors: Yukiko Kubota, Pittsburgh, PA (US); Bin Lu, Pittsburgh, PA (US); Jai-Young Kim, Gilroy, CA (US); Julius Kurt Hohlfeld, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 820 days.

(21) Appl. No.: 11/189,663

(22) Filed: Jul. 26, 2005

(65) Prior Publication Data

US 2007/0026263 A1 Feb. 1, 2007

(51) Int. Cl.
*G11B 5/66* (2006.01)

(52) U.S. Cl. ..................................................... 428/831

(58) Field of Classification Search ...... 428/800–848.9; 420/492, 493
See application file for complete search history.

(56) References Cited

U.S. PATENT DOCUMENTS

| | | | | |
|---|---|---|---|---|
| 5,233,575 A * | 8/1993 | Uchino et al. | ............ | 369/13.38 |
| 5,353,268 A | 10/1994 | Hintz | | |
| 5,399,372 A | 3/1995 | Grimes et al. | | |
| 5,820,769 A | 10/1998 | Chou | | |
| 5,981,017 A | 11/1999 | Agarwal et al. | | |
| 5,999,512 A | 12/1999 | Furuta | | |
| 6,349,076 B1 * | 2/2002 | Chen | .......................... | 428/825 |
| 6,367,924 B1 | 4/2002 | Sato et al. | | |
| 6,383,667 B1 | 5/2002 | Futamoto et al. | | |
| 6,506,508 B1 * | 1/2003 | Yoshida et al. | ............... | 428/831 |
| 6,534,204 B1 | 3/2003 | Akimoto et al. | | |
| 6,534,205 B2 | 3/2003 | Sato et al. | | |
| 6,541,125 B2 | 4/2003 | Futamoto et al. | | |
| 6,579,590 B2 | 6/2003 | Ju et al. | | |
| 6,579,634 B2 | 6/2003 | Saito | | |
| 6,603,619 B1 | 8/2003 | Kojima et al. | | |
| 6,703,099 B2 | 3/2004 | Belser | | |
| 6,723,458 B2 | 4/2004 | Shimizu et al. | | |

(Continued)

FOREIGN PATENT DOCUMENTS

EP 0 356 201 A2 2/1990

(Continued)

OTHER PUBLICATIONS

Arias et al. "Cu-Zr (Copper-Zirconium)." Journal of Phase Equilibria. 11.5 (1990): 452-459.*

(Continued)

*Primary Examiner*—Holly Rickman
*Assistant Examiner*—Lisa Chau
(74) *Attorney, Agent, or Firm*—Robert P. Lenart, Esq.; Alan G. Towner, Esq.; Pietragallo Gordon Alfano Bosick & Raspanti, LLP

(57) ABSTRACT

Metal alloy heatsink films for magnetic recording media are disclosed. The metal alloy heatsink films possess both high thermal conductivity and improved mechanical properties such as relatively high hardness. The metal alloy heatsink films also have controlled microstructures which are compatible with subsequently deposited crystalline magnetic recording layers. The films may comprise single phase CuZr or AgPd alloys having a selected crystal structure and orientation. The combination of high thermal conductivity, good mechanical properties and controlled microstructures makes the metal alloy heatsink films suitable for various applications including heat assisted magnetic recording systems.

26 Claims, 6 Drawing Sheets

U.S. PATENT DOCUMENTS

| | | |
|---|---|---|
| 6,775,100 B1 | 8/2004 | Belser et al. |
| 6,795,630 B2 | 9/2004 | Challener et al. |
| 2001/0019786 A1* | 9/2001 | Ikeda .................. 428/694 TM |
| 2002/0136927 A1 | 9/2002 | Hieda et al. |
| 2004/0057157 A1* | 3/2004 | Shimizu et al. ............. 360/135 |
| 2004/0136305 A1* | 7/2004 | Kato et al. ............... 369/59.11 |
| 2004/0240327 A1 | 12/2004 | Sendur et al. |
| 2004/0247945 A1* | 12/2004 | Chen et al. ............. 428/694 TS |
| 2004/0262149 A1 | 12/2004 | Ito et al. |
| 2005/0041950 A1 | 2/2005 | Rottmayer et al. |
| 2005/0135010 A1 | 6/2005 | Liu et al. |
| 2006/0154110 A1* | 7/2006 | Hohlfeld et al. ............. 428/823 |

OTHER PUBLICATIONS

U.S. Appl. No. 11/033,936, filed Jan. 12, 2005, Hohlfeld et al.

* cited by examiner

HEATSINK FILMS FOR MAGNETIC RECORDING MEDIA

GOVERNMENT CONTRACT

This invention was made with United States Government support under Agreement No. 70NANB1H3056 awarded by the National Institute of Standards and Technology (NIST). The United States Government has certain rights in the invention.

FIELD OF THE INVENTION

The present invention relates to heatsink films for magnetic recording media, and more particularly relates to metal alloy films having high thermal conductivities, improved hardnesses and controlled microstructures for use as underlayers in magnetic recording media.

BACKGROUND OF THE INVENTION

Magnetic recording in its conventional form has been projected to suffer from superparamagnetic instabilities at high bit densities. As the grain size of the magnetic recording medium is decreased in order to increase the areal density, a threshold known as the superparamagnetic limit at which stable data storage is no longer feasible is reached for a given material and temperature.

Thermal stability of magnetic recording systems can be improved by employing a recording medium formed of a material with a very high magnetic anisotropy. However, very few of such hard magnetic materials exist. Furthermore, with currently available magnetic materials, recording heads are not able to provide a sufficient magnetic writing field to write on such materials.

A strategy to control media noise for high areal density recording is to reduce the lateral dimensions of the grains. The resulting reduction of the grain volume needs to be compensated by a corresponding increase of the magnetic crystalline anisotropy energy density of the media in order to ensure thermal stability of the stored bits throughout a period of at least 10 years. Although the high magnetic crystalline anisotropy of recently developed granular media like $L1_0$ FePt or CoPt supports areal densities up to several Tbit/inch$^2$, it also hinders conventional writing.

One solution to overcome this dilemma is to soften the medium temporarily by locally heating it to temperatures at which the external write field can reverse the magnetization. This concept, known as heat assisted magnetic recording (HAMR), involves locally heating a magnetic recording medium to reduce the coercivity of the recording medium in a confined region so that the applied magnetic writing field can more easily direct the magnetization of the recording medium in the region during the temporary magnetic softening of the recording medium caused by the heat source. HAMR allows for the use of small grain media, which is desirable for recording at increased areal densities, with a larger magnetic anisotropy at room temperature assuring a sufficient thermal stability.

HAMR systems require the spatial and temporal variations of the heat profile to be managed. In particular, lateral heat diffusion in HAMR media is an important requirement for confining the heated region in the media to desired dimensions. Typical dimensions for Terabit per square inch recording are 25×25 nm$^2$, assuming a bit-aspect ratio of one. If the heat delivery system delivers an intensity profile with Gaussian FWHM of 25 nm, then no additional heat spread in the media can be tolerated.

Other important aspects of HAMR are the efficiency of the heat delivery system and the cooling rate of the media. Whereas the heating has to be powerful enough to heat the media to the desired temperatures (at least close to the Curie point), the cooling rate has to be fast enough to avoid thermal destabilization of the written information during the time the media cools down. Both issues, efficiency of the heat delivery system and fast cooling rate, are mutually competitive—the faster the cooling rate the more heating power is required to achieve a certain temperature increase. The use of heatsink layers to facilitate cooling may be possible. However, known metallic materials for high thermal conductivity such as pure Cu, Ag and Al are often too soft and ductile, and they do not exhibit sufficient mechanical durability during the magnetic recording media fabrication process and during write/read operations in hard disc drives and the like.

A need therefore exits for magnetic recording media with controlled heat transfer characteristics that are durable enough to withstand magnetic recording media fabrication and recording operations.

SUMMARY OF THE INVENTION

The present invention provides metal alloy heatsink layers for magnetic recording media that exhibit both high thermal conductivity and good mechanical properties such as relatively high hardness. The metal alloy heatsink films may have controlled crystal structures and orientations which are compatible with subsequently deposited crystalline magnetic recording layers. The heatsink films may be used with additional layers to improve adhesion with an underlying substrate, and to provide crystallographic control.

An aspect of the present invention is to provide a magnetic recording medium comprising a substrate, a magnetic recording layer and a metal alloy heatsink layer between the substrate and the magnetic recording layer.

Another aspect of the present invention is to provide a heatsink film comprising a substantially single phase metal alloy selected from CuZr and AgPd.

A further aspect of the present invention is to provide a heat assisted magnetic recording system comprising a magnetic recording medium comprising a magnetic recording layer and an underlying metal alloy heatsink layer and a heat assisted magnetic recording head positionable adjacent to the magnetic recording medium.

These and other aspects of the present invention will be more apparent from the following description.

DETAILED DESCRIPTION OF THE INVENTION

Figure 1:
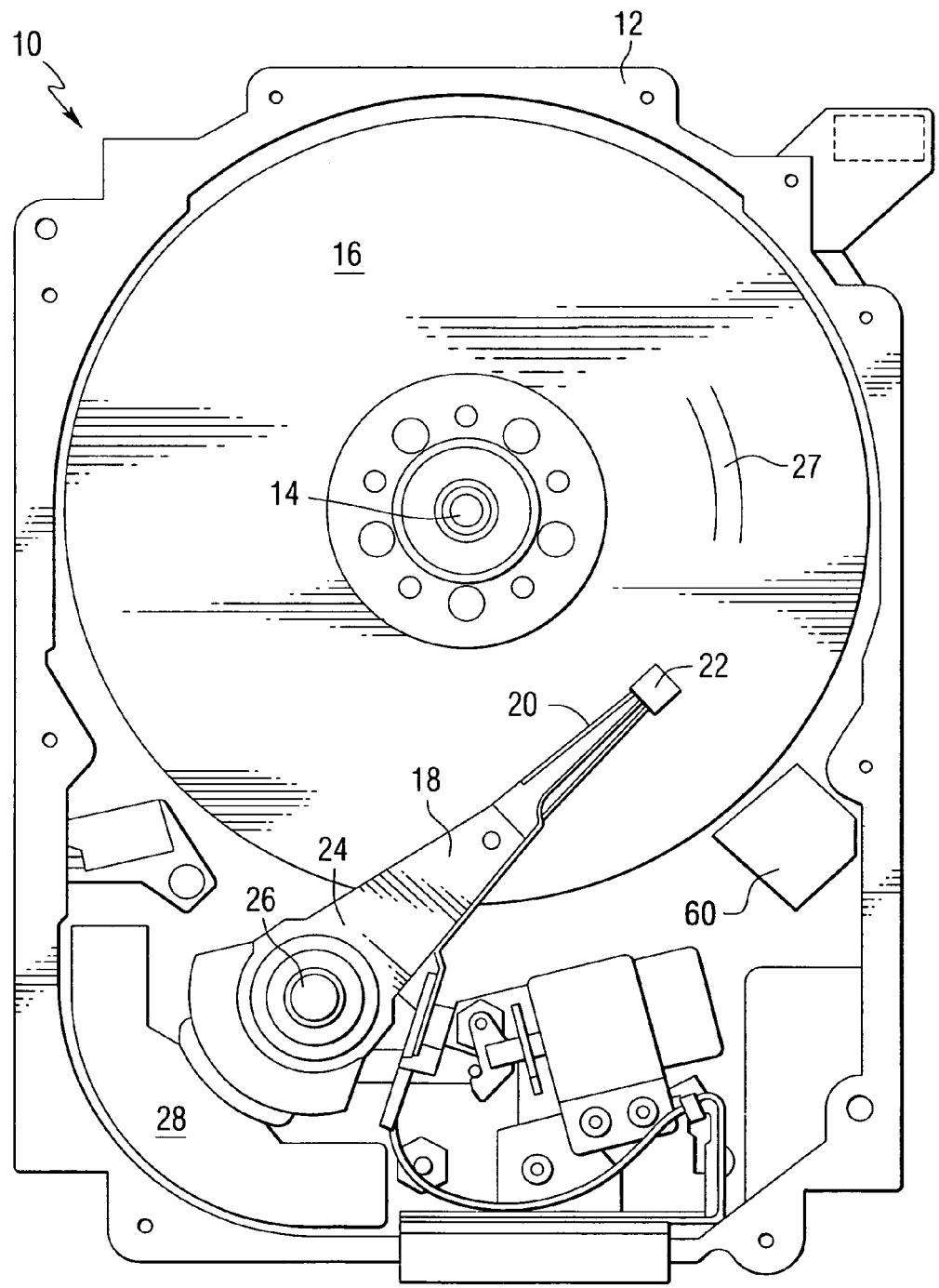
FIG. 1 is a pictorial representation of a disc drive storage system including a heat-assisted magnetic recording head and recording medium which may include a metal alloy heatsink film in accordance with an embodiment of the present invention.

FIG. 1 is a pictorial representation of a disc drive 10 including a heat assisted magnetic recording head. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium 16, which may be a perpendicular magnetic recording medium, within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art. In accordance with the present invention, a metal alloy heatsink layer is provided in the recording medium 16.

Figure 2:
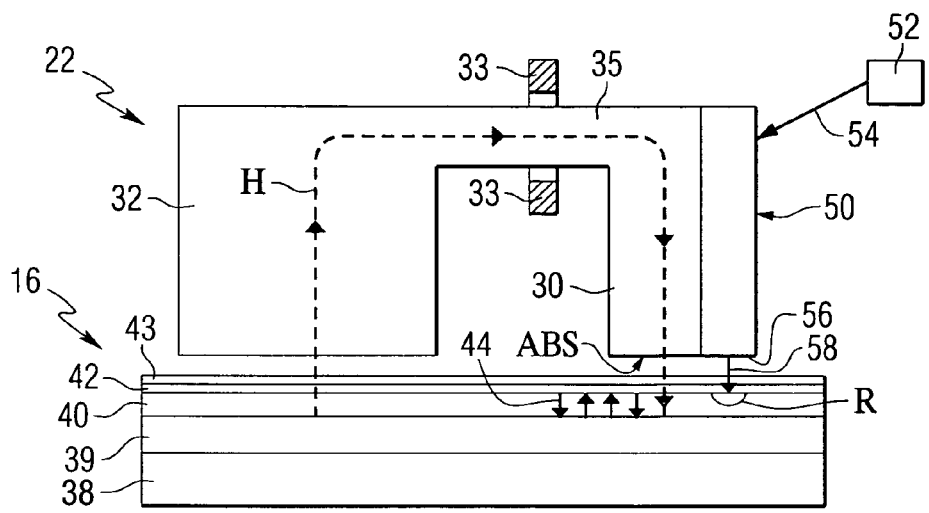
FIG. 2 is a partially schematic side view of a heat-assisted perpendicular magnetic recording head and recording medium which may include a metal alloy heatsink film in accordance with an embodiment of the present invention.

FIG. 2 is a partially schematic side view of a HAMR head 22 and a magnetic recording medium 16. Although an embodiment of the invention is described herein with reference to recording head 22 as a perpendicular magnetic recording head and the medium 16 as a perpendicular magnetic recording medium, it will be appreciated that aspects of the invention may also be used in conjunction with other type recording heads and/or recording media, such as longitudinal recording systems, where elevated temperatures are experienced during operation of the systems.

The HAMR head 22 includes a writer section comprising a main write pole 30 and a return or opposing pole 32 that are magnetically coupled by a yoke or pedestal 35. It will be appreciated that the HAMR head 22 may be constructed with a write pole 30 only and no return pole 32 or yoke 35. A magnetization coil 33 may surround the yoke or pedestal 35 for energizing the HAMR head 22. The HAMR head 22 also may include a read head, not shown, which may be any conventional type read head as is generally known in the art. The recording medium 16 is positioned adjacent to or under the recording head 22 for movement, for example, in the direction of arrow A.

As illustrated in FIG. 2, the recording head 22 also includes structure for HAMR to heat the magnetic recording medium 16 proximate to where the write pole 30 applies the magnetic write field H to the recording medium 16. Specifically, such structure for HAMR may include, for example, a planar optical waveguide schematically represented by reference number 50. The waveguide 50 is in optical communication with a light source 52. The light source 52 may be, for example, a laser diode, or other suitable laser light sources for coupling a light beam 54 into the waveguide 50. Various techniques that are known for coupling light beam 54 into the waveguide 50 may be used in conjunction with the invention, such as, for example, the light source 52 may work in association with an optical fiber and external optics, such as an integrated spherical lens, for collimating the light beam 54 from the optical fiber toward a diffraction grating (not shown). Alternatively, for example, a laser may be mounted on the waveguide 50 and the light beam 54 may be directly coupled into the waveguide 50 without the need for external optical configurations. Once the light beam 54 is coupled into the waveguide 50, the light may propagate through the optical waveguide 50 toward a truncated end 56 of the waveguide 50 that is formed adjacent the air-bearing surface (ABS) of the recording head 22. The laser light 58 is then directed toward the medium 16 where it heats the magnetic recording layer 40 in a region R beneath the waveguide 50. Such heating causes desorption or decomposition of the lubricating film 43 near the heated region R.

As shown in FIG. 2, the heat-assisted magnetic recording medium 16 includes a substrate 38, a metal alloy heatsink layer 39, a magnetic recording layer 40 and a protective overcoat 42. A lubricant film 43 may be applied on the overcoat 42. The substrate 38 may be made of any suitable material such as ceramic glass, amorphous glass, aluminum or NiP coated AlMg. The magnetic recording layer 40 has a typical thickness of from about 2 to about 50 nm, and may comprise materials having relatively high anisotropies at ambient temperature, such as CoPt, FePt, FeNiPt, CoCrPt and RECo (e.g., $SmCo_5$ or $YCo_5$) alloys, and Co/Pt multilayers. The protective layer 42 may be made of any suitable material such as diamond-like carbon or silicon nitride (SiN).

The magnetic recording medium 16 may optionally include a soft magnetic underlayer (SUL) (not shown) beneath the magnetic recording layer 40. The SUL may have a typical thickness of from about 50 to about 1,000 nm, and may be made of any suitable material such as CoFe, FeCoB, FeAlN, FeAlSi, NiFe, CoZrNb or FeTaN. The SUL may also comprise laminated structures such as (FeCoB/Ta)·n where n is from 2 to 10, or (FeAlSi/C)·n where n is from 2 to 10. The SUL may further comprise exchange biased structures such as Cu/(IrMn/FeCo)·n where n is from 1 to 5. A seedlayer (not shown) may optionally be provided, e.g., between the SUL and the recording layer 40. The seedlayer may have has a typical thickness of from about 1 to about 50 nm and may be used to control properties such as orientation and grain size of the subsequently deposited layers. For example, the seedlayer may be a face centered cubic material such as Pt which controls the orientation of the subsequently deposited film 40, may be a material such as Ru or Rh which controls grain size and facilitates epitaxial growth of the subsequently deposited layers, or a combination thereof. The seedlayer may be made of one or more layers of material such as CoCr, CoCrRu, Ru, Pt, Pd, Rh, Ta, TiC, indium tin oxide (ITO), AlN or ZnO.

In accordance with the present invention, the heatsink layer 39 of the magnetic recording medium 16 comprises a metal alloy that possesses both high thermal conductivity and hardness. A thermal conductivity of at least about 100 W/m-K may be used, for example, at least about 200 or 300 W/m-K. As a particular example, a vertical thermal conductivity of 360 W/m-K may be achieved for a 200 nm thick CuZr film comprising 0.3 atomic percent Zr. A hardness corresponding to a maximum scratch depth of about 3 nm or 2.5 nm may be used, based upon the standard nanoscratch test more fully described below.

The thickness of the metal alloy heatsink layer 39 is controlled in order to provide the desired heat transfer performance while maintaining sufficient mechanical durability and fabrication capability. The thickness of the heatsink layer 39 may be from about 20 to about 500 nm, for example, from about 100 to about 300 nm. As a particular example, the thickness of the heatsink layer 39 may be from about 150 to about 200 nm.

Suitable metal alloys of the heatsink layer 39 include CuZr and AgPd. The compositions of the metal alloy heatsink films may be controlled such that unwanted secondary phases or precipitates are reduced or eliminated. Thus, the metal alloy may be a substantially single phase material. For example, the Zr content of the CuZr alloys may be kept below the level where $Cu_9Cr_2$ or other second phases or precipitates are formed. Precipitates or other phases within the heatsink layer can scatter laser light during HAMR operations, which should be avoided.

For CuZr alloys, the amount of Zr may be from about 0.1 to about 1 atomic percent, with the remainder comprising Cu and incidental impurities. For example, the amount of Zr may be from about 0.2 to about 0.4 atomic percent. As a particular example, the Zr may comprise about 0.3 atomic percent of the CuZr alloy.

For AgPd alloys, the amount of Pd may be from about 0.1 to about 30 atomic percent, with the remainder comprising Ag and incidental impurities. For example, the amount of Pd may be from about 0.5 to about 20 atomic percent. As a particular example, the Pd may comprise about 10 atomic percent of the AgPd alloy.

In one embodiment, the metal heatsink alloys comprise a face centered cubic (fcc) crystal structure which facilitates growth of desirable crystal structures of the subsequently deposited magnetic recording layers. For example, for $L1_0$ magnetic recording layers such as CoPt, FePt and FeNiPt, the heatsink layer may comprise AgPd having an fcc structure with (100) texture. For hexagonal magnetic recording layers such as CoPtCr and Co/Pt multilayers, the heatsink layer may comprise CuZr having an fcc structure with (111) texture.

Both AgPd and CuZr films can be textured to have (001) out of plane texture by proper choice of seedlayers underneath. These layers may serve both as heatsink and crystallographic seedlayers in the media structure. If additional layers are deposited between the recording layer and the heatsink layer, materials such as Pt may be desired instead of aggressive thermal barriers such as amorphous dielectrics.

The present heatsink layers may be used with additional layers, for example, to improve adhesion with the substrate and/or to provide crystallographic control. Examples of additional layers include Ta/CuZr with Cu (111) orientation in the film normal direction, and Ta/MgO/Ag layer structures to align Ag (200) orientation in the film normal direction. The heatsink layer can be a dual layer such as an FeCo SUL and a CuZr layer, where the FeCo underlayer works as both a SUL for perpendicular recording and as a heatsink.

Figure 3:
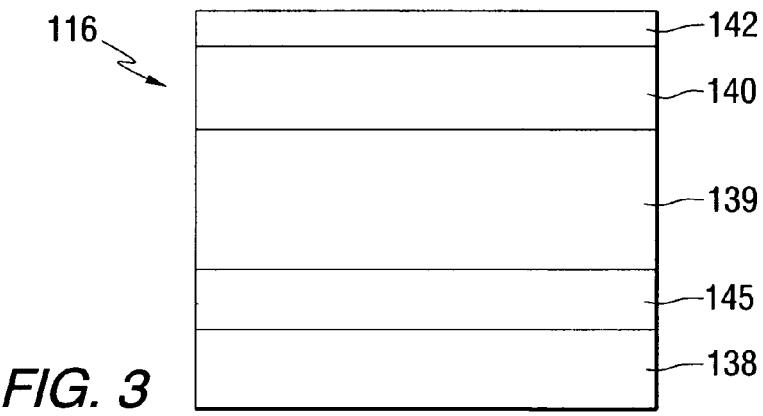
FIG. 3 is a partially schematic side view of a magnetic recording medium including a metal alloy heatsink film in accordance with an embodiment of the present invention.

FIG. 3 illustrates a magnetic recording medium 116 including a metal alloy heatsink film 139 in accordance with an embodiment of the present invention. The heatsink film 139 comprises a CuZr alloy having a thickness of approximately 200 nm. It is deposited on a Ta seedlayer 145 which covers a glass substrate 138. A CoPt magnetic recording layer 140 having (001) texture is deposited on the CuZr alloy heatsink layer 139. The recording layer 140 may thus have an $L1_0$-$CoPt_x$ tetragonal structure in which the c-axis (001) may be aligned in the film normal direction for perpendicular recording, or may be aligned in the plane of the film for longitudinal recording. A protective overcoat 142 covers the magnetic recording layer 140.

Figure 4:
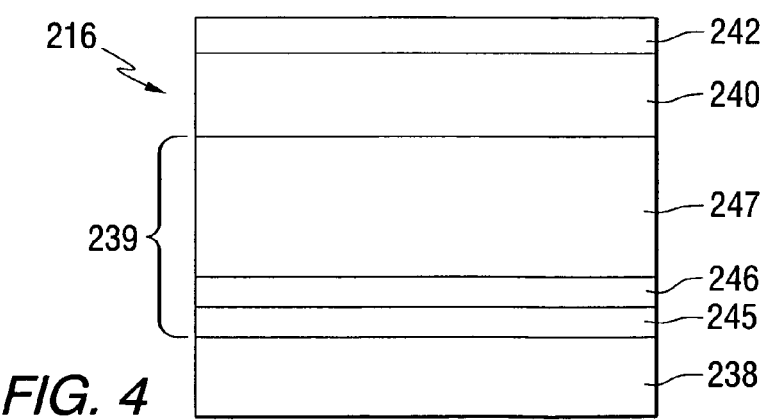
FIG. 4 is a partially schematic side view of a magnetic recording medium including a metal alloy heatsink film in accordance with another embodiment of the present invention.

FIG. 4 shows a magnetic recording medium 216 including a multilayer heatsink structure 239 in accordance with another embodiment of the present invention. The heatsink structure 239 comprises a AgPd alloy layer 247 having a thickness of approximately 200 nm deposited on a MgO layer 246 having a thickness of approximately 10 nm. A Ta layer 245 is provided between a glass substrate 238 and the MgO layer 246. A magnetic recording layer 240 comprising FePt having (001) texture is deposited on the AgPd heatsink layer 247. The recording layer 240 may thus have an $L1_0$-$FePt_x$ tetragonal structure in which the c-axis (001) may be aligned in the film normal direction for perpendicular recording, or may be aligned in the plane of the film for longitudinal recording. A protective overcoat 242 is deposited on the magnetic recording layer 240.

Figure 5:
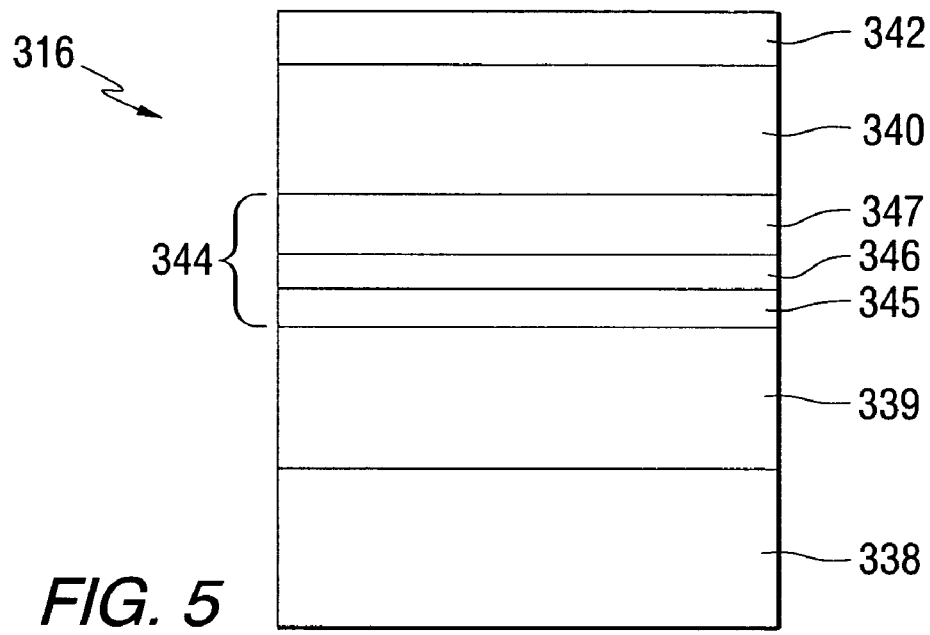
FIG. 5 is a partially schematic side view of a magnetic recording medium including a metal alloy heatsink film in accordance with a further embodiment of the present invention.

FIG. 5 illustrates a magnetic recording medium 316 including a metal alloy heatsink film 339 in accordance with a further embodiment of the present invention. The heatsink layer 339 comprises a CuZr alloy having a thickness of approximately 200 nm deposited on a substrate 338. A seedlayer structure 344 comprising a Ta layer 345 having a thickness of about 1 nm is deposited on the CuZr alloy heatsink layer 339. The seedlayer structure 344 may also comprise an AlN layer 346 having a thickness of about 1 nm deposited on the Ta layer 345, and a Pt layer 347 having a thickness of about 7.5 nm deposited on the AlN layer 346. Alternatively, the seedlayer structure 344 may comprise a Pt layer 346 having a thickness of about 3 nm deposited on the Ta layer 345, and a Ru layer 347 having a thickness of about 10 nm deposited on the Pt layer 346. A magnetic recording layer 340 comprising Co/Pt multilayers (N=15) is deposited on the seedlayer structure 344. An overcoat 342 having a thickness of about 5 nm covers the Co/Pt multilayer recording layer 340.

Figure 6:
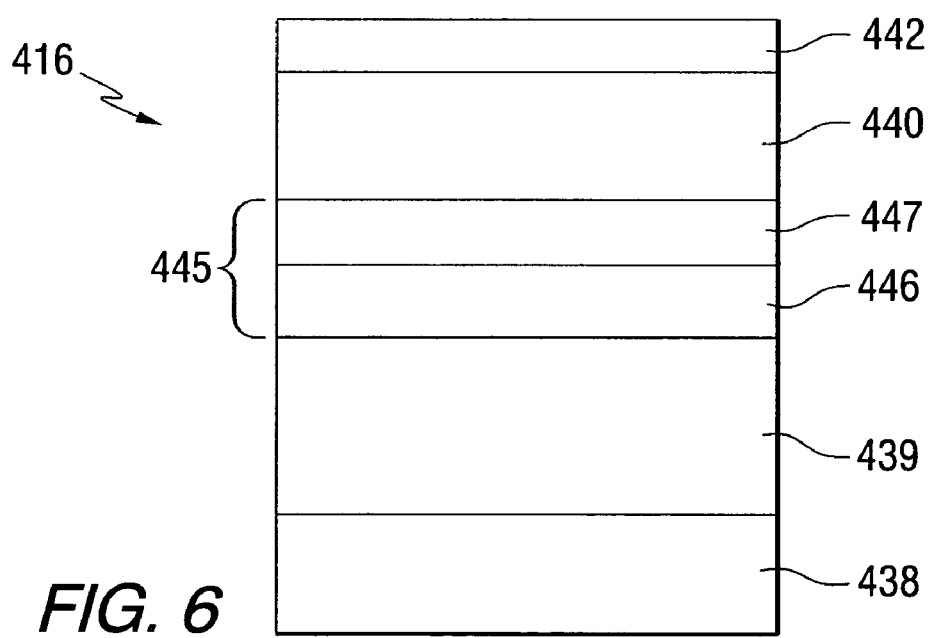
FIG. 6 is a partially schematic side view of a magnetic recording medium including a metal alloy heatsink film in accordance with a another embodiment of the present invention.

FIG. 6 shows a magnetic recording medium 416 including a metal alloy heatsink film 439 in accordance with a another embodiment of the present invention. The heatsink layer 439 comprises a CuZr alloy having a thickness of about 200 nm deposited on a substrate 438. A seedlayer structure 445 comprising a CoCrRu layer 446 having a thickness of about 3 to 5 nm is deposited on the CuZr alloy heatsink layer 439. The seedlayer structure 445 also includes a Ru or Pt layer 447 having a thickness of about 3 to 5 nm deposited on the CoCrRu layer 446. For perpendicular magnetic recording the layer 447 may comprise Ru, while for longitudinal magnetic recording the layer 447 may comprise Pt. A magnetic recording layer 440 comprising hexagonal $Co_3Pt$ is deposited on the seedlayer structure 445. An overcoat 442 having a thickness of about 5 nm covers the recording layer 440.

The following examples are intended to illustrate various aspects of the present invention, and are not intended to limit the scope of the invention.

EXAMPLE 1

A technique known as the femtosecond (or ultrafast) pump probe method was used to evaluate thermal properties of different heatsink films. It is a combination of high temporal resolution provided by femtosecond lasers and high magnetic sensitivity offered by magneto-optical characterization techniques. In a pump-probe configuration, the equilibrium magnetization is perturbed by an intense pump (Ti: sapphire laser) pulse. The ultra-fast evolution of the distorted magnetic state is then monitored by a second probe (laser beam produced by the SHG generator) pulse. For the thermal conductivity measurement, the reflectivity change at the sample surface is monitored to compare the value expected from the theoretical value from the sample layer structure.

Figure 7:
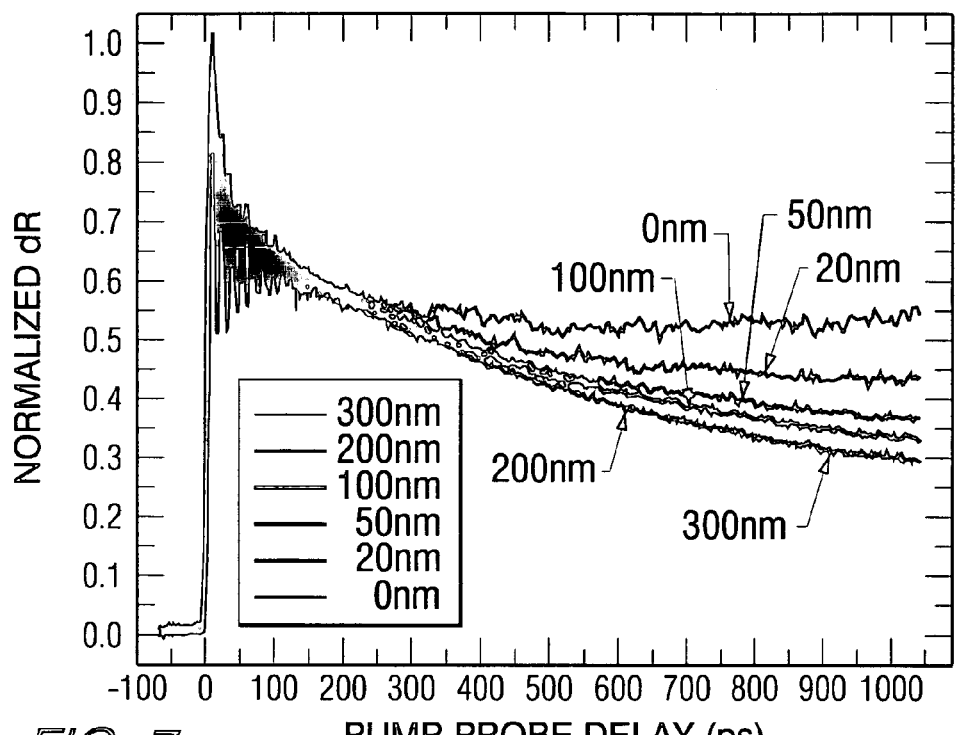
FIG. 7 is a graph of reflectivity change versus pump-probe delay, illustrating faster cooling speeds for thicker CuZr heatsink layers.

FIG. 7 presents the cooling speed dependence on the CuZr heatsink thickness in a sample similar to that shown in FIG. 5 measured by the pump probe method. The cooling speed decreases with the CuZr thickness, but no improvement is observed from the 200 nm to 300 nm samples. A thickness of about 200 nm or thicker may be desirable for fast cooling.

Figure 8:
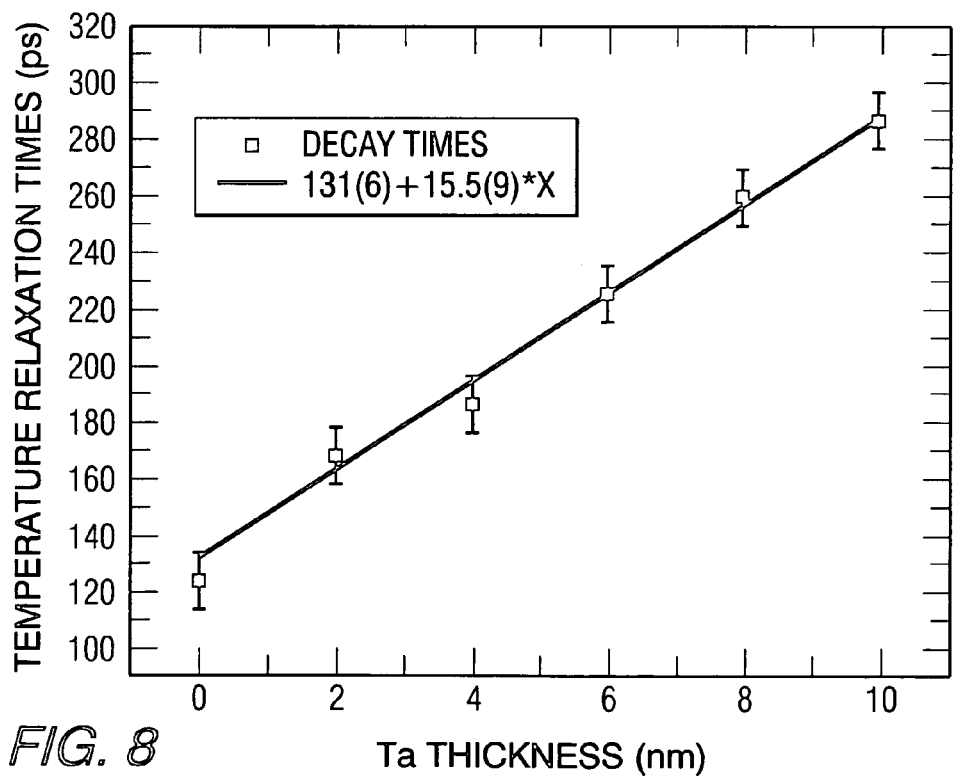
FIG. 8 is a graph of temperature relaxation time versus Ta seedlayer thickness, illustrating slower cooling speeds for thicker Ta layers.

Additional layers, such as adhesion layers and seedlayers, may alter the thermal conductivity of the entire layer stack in which the heatsink layers are incorporated. For example, FIG. 8 shows the cooling speed dependence of the Ta layer thickness in a film structure similar to that shown in FIG. 5. Thicker Ta layers resulted in slower cooling speed of the seedlayer structure. In this case, the Ta adhesion layer acts as a thermal resistor. The interfaces between the layers may also be a source of the thermal resistance, particularly when the adjacent layers are dissimilar such as MgO/Ag (oxide/metal) and Ta/CuZr (amorphous/crystalline) interfaces.

Figure 9:
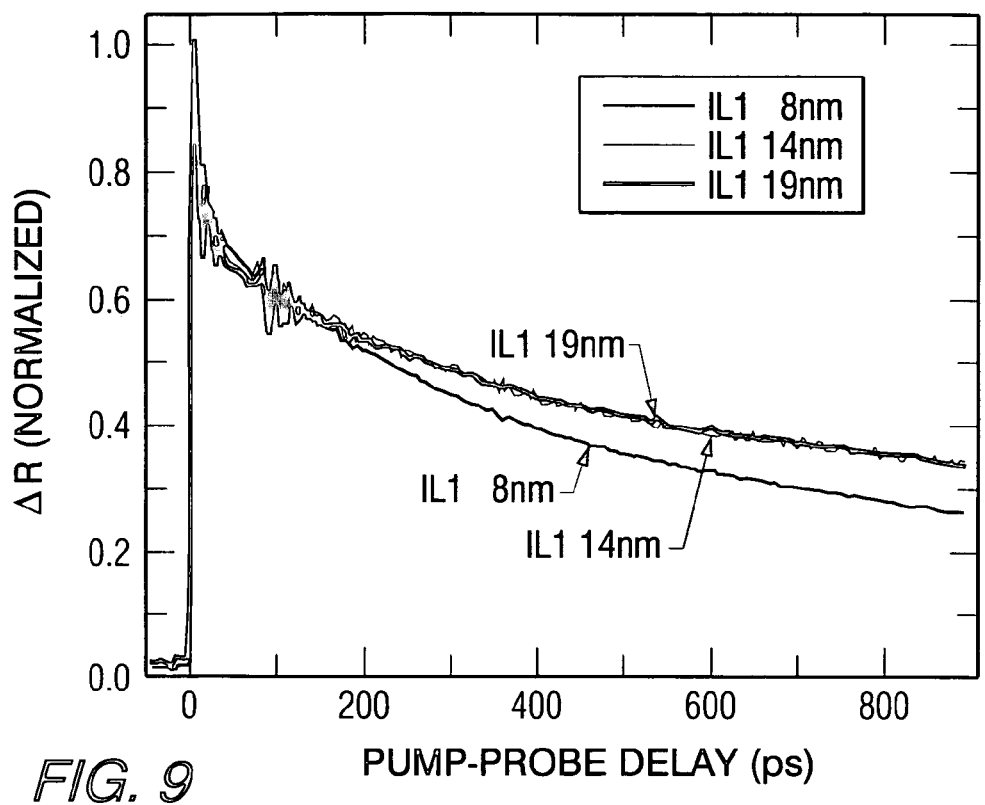
FIG. 9 is a graph of reflectivity change versus pump-probe delay, illustrating different cooling speeds for structures having a 200 nm thick CuZr alloy heatsink layer and varying thicknesses of Ta/AlN/Pt seedlayers.
Figure 10:
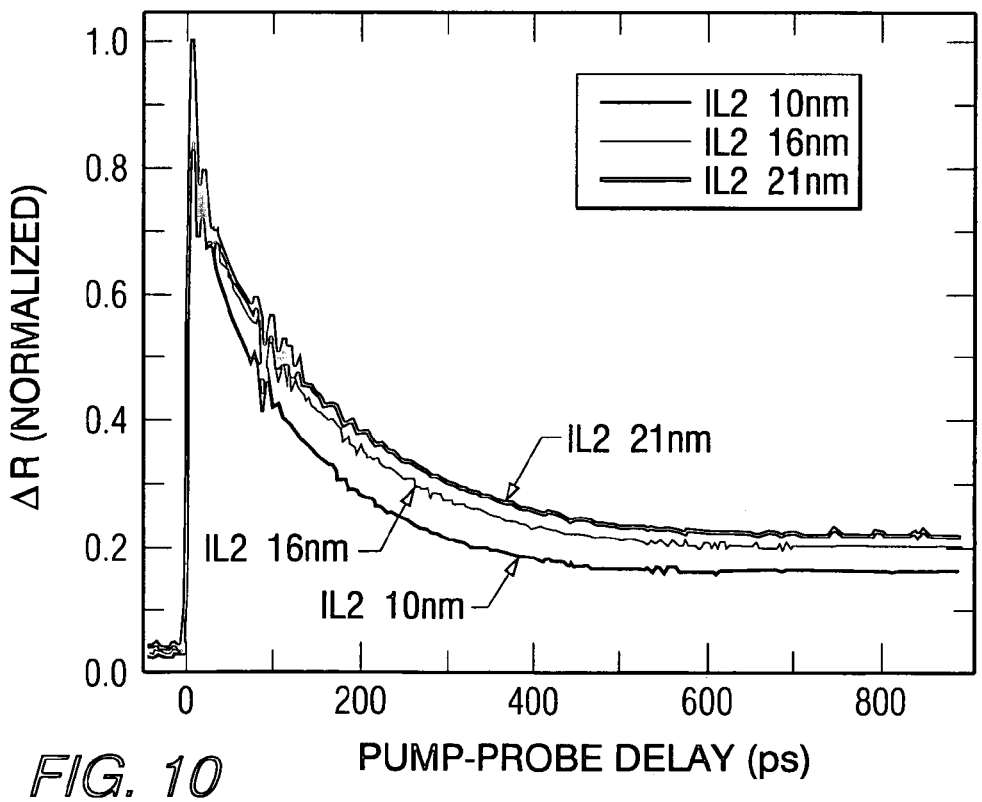
FIG. 10 is a graph of reflectivity change versus pump-probe delay, illustrating different cooling speeds for structures having a 200 nm thick CuZr alloy heatsink layer and varying thicknesses of Ta/Pt/Ru seedlayers. The structures measured in FIG. 10 exhibit increased cooling speeds in comparison with the structures measured in FIG. 9.

FIGS. 9 and 10 present the cooling speed dependence of 200 nm thick CuZr heatsink samples similar to those shown in FIG. 5. IL1 represents the total thickness of Ta/AlN/Pt seedlayers, while IL2 is the total thickness of the Ta/Pt/Ru seedlayers. Improved cooling speed is achieved for the Ta/Pt/Ru sample over the Ta/AlN/Pt sample. This cooling speed difference may be attributable to the amorphous AlN layer which may act as a thermal barrier, considering the similarity in the total IL thickness of the samples, thermal conductivities of the other materials involved, and the number of interfaces involved.

A fast cooling level of about 200 ps may be obtained with Co/Pt multilayers comprising multiple interfaces which can have a negative effect in a HAMR media designs. Many interfaces in the Co/Pt multilayer structures may cause difficulty in fast heating and fast cooling cycles the HAMR media are subjected to. This may be due to the fact that the pump laser beam has enough penetration depth to heat up the multilayer structure while the heating by the thermal diffusion plays a minor role in which interfaces act as thermal barrier and that the similarity in the thermal properties of Co and Pt and crystallographic coherence at the multilayer interfaces may improve the thermal conductance at the multilayer interfaces.

EXAMPLE 2

Figure 11A:
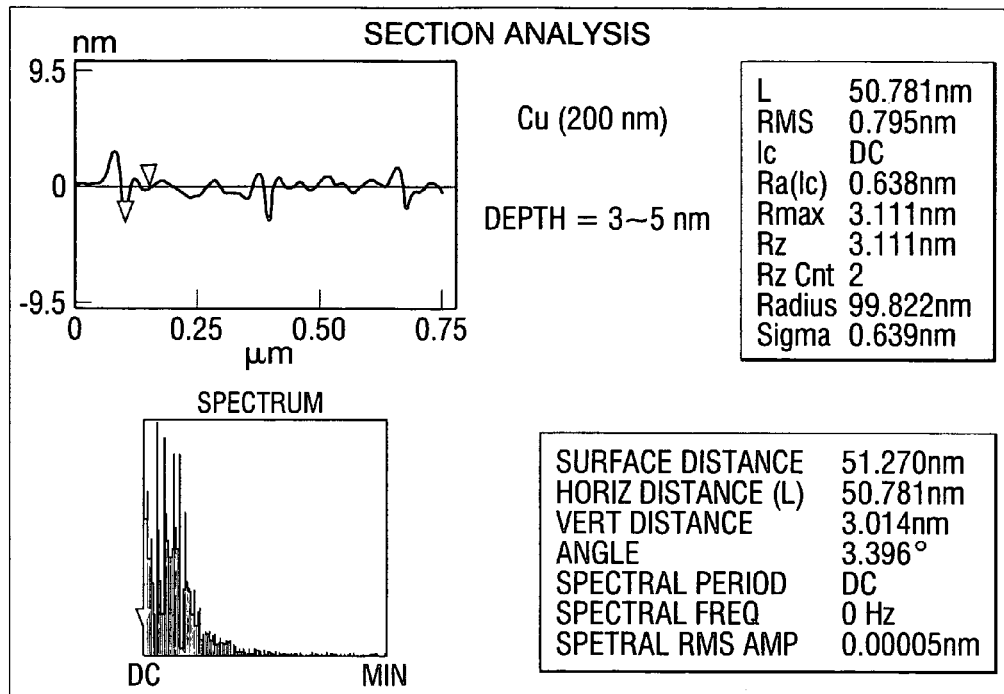
FIGS. 11a and 11b illustrate a scratch depth comparison between a relatively low hardness pure Cu film in comparison with a relatively high hardness CuZr alloy film of the present invention.
Figure 11B:
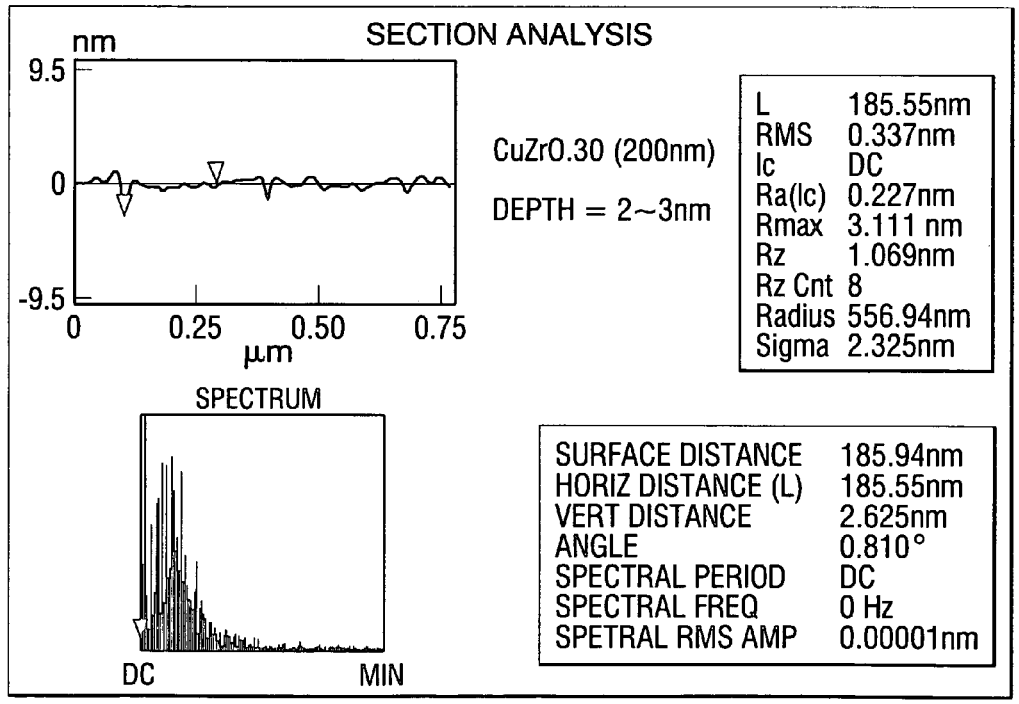

FIGS. 11a and 11b illustrate a scratch depth comparison between a relatively low hardness pure Cu film in comparison with a relatively high hardness CuZr film of the present invention. As shown in FIG. 11a, a pure Cu film subjected to the standard surface scratch test exhibits a scratch depth of approximately 3 to 5 nm. In FIG. 11b, the CuZr alloy film of the present invention exhibits a scratch depth of approximately 2 to 3 nm. FIG. 11b illustrates significant improvement in the mechanical hardness of the CuZr alloy film subjected to the surface scratch test under Atomic Force Microscope (AFM). The scratch depth at the CuZr film surface is about a half of those made on pure Cu surface. The surface scratch test is commonly conducted to test the compatibility of a material with the hard disc medium material and with the media fabrication process. Typical post sputtering processes including lubricant application, buff/wipe and glide testing can apply mechanical stress which may damage ductile and soft media materials such as pure Cu. The samples of FIGS. 11a and 11b went through a standard post sputtering process, and the flyability with the glide height of 0.35 micro-inch (~9.5 nm) was confirmed with 90-100% glide yield.

Whereas particular embodiments of this invention have been described above for purposes of illustration, it will be evident to those skilled in the art that numerous variations of the details of the present invention may be made without departing from the invention as defined in the appended claims.

What is claimed is:

1. An apparatus comprising:
a substrate;
a magnetic recording layer; and
a CuZr alloy heatsink layer between the substrate and the magnetic recording layer, wherein the CuZr alloy heatsink layer consists of from about 0.1 to about 1 atomic percent Zr with the balance Cu.

2. The apparatus of claim 1, wherein the CuZr alloy heatsink layer comprises a single phase.

3. The apparatus of claim 1, wherein the CuZr alloy heatsink layer has a thermal conductivity of at least about 100 W/m-K.

4. The apparatus of claim 1, wherein the CuZr alloy heatsink layer has a thermal conductivity of at least about 300 W/m-K.

5. The apparatus of claim 1, wherein the CuZr alloy heatsink layer has a hardness corresponding to a maximum scratch depth of less than 3 nm based upon a standard nano-scratch test.

6. The apparatus of claim 1, wherein the CuZr alloy heatsink layer has a thickness of from about 20 to about 500 nm.

7. The apparatus of claim 1, wherein the CuZr alloy heatsink layer has a thickness of from about 100 to about 300 nm.

8. The apparatus of claim 1, wherein the CuZr alloy heatsink layer comprises a face centered cubic crystal structure.

9. The apparatus of claim 8, wherein the magnetic recording layer comprises an $L1_0$ crystal structure.

10. The apparatus of claim 9, wherein the magnetic recording layer comprises a CoPt, FePt or FeNiPt alloy.

11. The apparatus of claim 1, wherein the CuZr alloy heatsink layer comprises a face centered cubic crystal structure with (111) texture.

12. The apparatus of claim 11, wherein the magnetic recording layer comprises a hexagonal crystal structure.

13. The apparatus of claim 12, wherein the magnetic recording layer comprises a CoPtCr or RECo alloy.

14. The apparatus of claim 1, further comprising at least one seedlayer between the substrate and the CuZr alloy heatsink layer.

15. The apparatus of claim 1, further comprising at least one seedlayer between the CuZr alloy heatsink layer and the magnetic recording layer.

16. The apparatus of claim 1, further comprising at least two seedlayers between the CuZr alloy heatsink layer and the magnetic recording layer, wherein one of the seedlayers comprises Ta and another of the seedlayers comprises Pt.

17. An apparatus comprising:
- a substrate;
- a magnetic recording layer; and
- a CuZr alloy heatsink layer between the substrate and the magnetic recording layer, wherein the CuZr alloy heatsink layer consists of from about 0.1 to about 1 atomic percent Zr, with the balance Cu and incidental impurities.

18. The apparatus of claim 17, wherein the CuZr alloy heatsink layer comprises a single phase.

19. The apparatus of claim 17, wherein the CuZr alloy heatsink layer has a thermal conductivity of at least about 100 W/m-K.

20. The apparatus of claim 17, wherein the CuZr alloy heatsink layer has a thermal conductivity of at least about 300 W/m-K.

21. The apparatus of claim 17, wherein the CuZr alloy heatsink layer has a hardness corresponding to a maximum scratch depth of less than 3 nm based upon a standard nanoscratch test.

22. The apparatus of claim 17, wherein the CuZr alloy heatsink layer has a thickness of from about 20 to about 500 nm.

23. The apparatus of claim 17, wherein the CuZr alloy heatsink layer has a thickness of from about 100 to about 300 nm.

24. The apparatus of claim 17, wherein the CuZr alloy heatsink layer comprises a face centered cubic crystal structure.

25. The apparatus of claim 17, wherein the CuZr alloy heatsink layer comprises a face centered cubic crystal structure with (111) texture.

26. An apparatus comprising:
- a substrate;
- a magnetic recording layer; and
- a CuZr alloy layer between the substrate and the magnetic recording layer, wherein the CuZr alloy layer consists of from about 0.1 to about 1 atomic percent Zr with the balance Cu and the CuZr alloy layer has a thermal conductivity of at least about 100 W/m-K.

* * * * *